US008239460B2

(12) United States Patent
Meek et al.

(10) Patent No.: US 8,239,460 B2
(45) Date of Patent: Aug. 7, 2012

(54) CONTENT-BASED TAGGING OF RSS FEEDS AND E-MAIL

(75) Inventors: Christopher A. Meek, Kirkland, WA (US); Ojiakonobi Amala Udezue, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 11/771,236

(22) Filed: Jun. 29, 2007

(65) Prior Publication Data
US 2009/0006285 A1    Jan. 1, 2009

(51) Int. Cl.
*G06F 15/16* (2006.01)
*G06F 17/00* (2006.01)
(52) U.S. Cl. ............ 709/206; 706/12; 706/15; 706/16; 706/18; 706/20; 707/668; 707/673
(58) Field of Classification Search ............ 706/15–16, 706/18, 20, 12; 709/206
See application file for complete search history.

(56) References Cited

U.S. PATENT DOCUMENTS

| | | | |
|---|---|---|---|
| 5,446,891 A * | 8/1995 | Kaplan et al. ............... 707/2 |
| 6,161,130 A | 12/2000 | Horvitz | |
| 6,266,664 B1 * | 7/2001 | Russell-Falla et al. ........... 707/5 |
| 6,654,787 B1 * | 11/2003 | Aronson et al. ............ 709/206 |
| 6,816,885 B1 | 11/2004 | Raghunandan | |
| 6,832,244 B1 | 12/2004 | Raghunandan | |
| 7,051,277 B2 | 5/2006 | Kephart et al. | |
| 7,069,259 B2 * | 6/2006 | Horvitz et al. ................. 706/25 |
| 7,076,527 B2 | 7/2006 | Bellegarda et al. | |
| 7,290,035 B2 * | 10/2007 | Mattathil ................... 709/206 |
| 7,552,179 B2 * | 6/2009 | Jain et al. .................... 709/206 |
| 7,558,832 B2 * | 7/2009 | Rounthwaite et al. ........ 709/206 |
| 7,568,008 B2 * | 7/2009 | Jain et al. .................... 709/206 |
| 7,698,369 B2 * | 4/2010 | Addante et al. ............... 709/206 |
| 7,720,911 B2 * | 5/2010 | Addante et al. ............... 709/206 |
| 2002/0122543 A1 | 9/2002 | Rowen | |
| 2004/0059708 A1 * | 3/2004 | Dean et al. ..................... 707/1 |
| 2005/0144239 A1 * | 6/2005 | Mattathil ..................... 709/206 |
| 2005/0165895 A1 | 7/2005 | Rajan et al. | |

(Continued)

FOREIGN PATENT DOCUMENTS
WO    02077768 A2    10/2002
(Continued)

OTHER PUBLICATIONS
Gralla, Preston "Google Search and Tools in a Snap", Sams Publishing, Apr. 2006.*
(Continued)

*Primary Examiner* — Ashok Patel
*Assistant Examiner* — Linglan Edwards
(74) *Attorney, Agent, or Firm* — Lee & Hayes, PLLC

(57) ABSTRACT

Providing for automated generation of tags (e.g., metadata descriptors) for items of e-mail or syndication formatted communication is described herein. By way of example, a system can include a filtering component that can generate one or more tags based on information relevant to content of the communication, a sender, or recipient, or combinations thereof. In addition, such tags can be automatically attached to a received item, or a presentation component can furnish the tags to a recipient (e.g., by way of a communication device user interface) for selection, whereby selected tags are associated with the item of communication. Accordingly, the subject innovation provides for improved classification and description of items of communication by automatic generation of descriptive and/or representative tags associated therewith.

19 Claims, 13 Drawing Sheets

U.S. PATENT DOCUMENTS

| | | | |
|---|---|---|---|
| 2006/0053200 A1* | 3/2006 | McCown | 709/206 |
| 2006/0089924 A1* | 4/2006 | Raskutti et al. | 707/1 |
| 2006/0123091 A1 | 6/2006 | Ho | |
| 2006/0282503 A1 | 12/2006 | Gwozdz | |
| 2007/0143298 A1* | 6/2007 | Surendran et al. | 707/10 |
| 2008/0256443 A1* | 10/2008 | Li et al. | 715/700 |

FOREIGN PATENT DOCUMENTS

| | | |
|---|---|---|
| WO | 03017141 A1 | 2/2003 |
| WO | 2004109588 A1 | 12/2004 |
| WO | 2005043270 A2 | 5/2005 |

OTHER PUBLICATIONS

Resnick, "RCF 2822—Internet Message Format", IEFT, www(dot)ietf(dot)org/rfc/rfc2822.txt, Apr. 2001.*

David R. Karger, et al., "Haystack: a Customizable General-Purpose Information Management Tool for End Users of Semistructured Data" (2005) http://www-db.cs.wisc.edu/cidr/cidr2005/papers/P02.pdf.

Kenricj Mock, "An experimental framework for email categorization and management", SIGIR '01: Proceedings of the 24th annual international ACM SIGIR conference on Research and development in information retrieval, 200, p. 392-393, New Orleans, Louisiana, United States, ACM Press, New York, NY, USA http://www.math.uaa.alaska.edu/~afkjm/papers/emailcat.pdf.

Mark Dredze, "Automatically classifying emails into activities", lUI '06: Proceedings of the 11th international conference on Intelligent user interfaces, 2006, p. 70-77, Sydney, Australia, ACM Press, New York, NY, USA http://triple.semanticweb.org/svn/sw/2006/10/email-speech/Automatically%20classifying%20emails%20into%20activities.pdf.

International Search Report & Written Opinion dated Dec. 31, 2008 for PCT Application Serial No. PCT/US2008/066399, 10 Pages.

* cited by examiner

CONTENT-BASED TAGGING OF RSS FEEDS AND E-MAIL

BACKGROUND

Electronic communication has become a prevalent and important mechanism for distribution of information. E-mail, instant messaging, voice messaging, website-based communication feeds, and the like provide a great deal of interpersonal and mass communication. Generation and distribution of news is becoming more prevalent by online mechanisms, such as web blogs, news webpages, HTML links and the like. In particular, various online syndication formats have been generated in order to more efficiently enable publication, distribution, and retrieval of newscast information. Moreover, online communication typically utilizes multiple mechanisms for communication; web blogs and webpages deliver published content, e-mail send to subscribers includes versions of such information and links to related topics or related discussions, and instant messaging and/or short messaging facilitates notification of newly published information.

With the increase of online communication and the various forms of such communication, mechanisms have been developed to sort and/or classify instances of communication to facilitate summarization or review. As the Internet and private intranets have grown, as user-based connection bandwidths have increased, and as more individuals obtain personal and mobile computing devices, the volume of online communication has also increased. Such volumes can be overwhelming, however. With an increase in information comes a need to parse information for relevancy, storage, retrieval, reference, and the like. An individual who receives hundreds or thousands of e-mail messages per day, for example, can appreciate the need for conveying quick summaries of such information. For example, e-mail messages have developed subject lines that convey a quick, visual representation of the subject of a communication. E-mail management programs have developed pop-up type dialogue boxes indicating a shortened version of a communication along with an optional auditory indication. A recipient can quickly scan the pop-up dialogue box to understand what the communication relates to, reducing the time required to peruse the message decreasing any interruptions while doing so.

One mechanism for categorizing media content, such as pictures or video clips, is the use of metadata tags. Tags are keywords associated with a piece of content that can describe the content, or indicate a word, phrase, acronym, or the like pertinent to aspects of the content. Tags are often generated by a content provider, e.g., a publisher or the like, to associate with media content and to give a short description of the content to a recipient. Such description can be useful to quickly determine whether time should be spent reviewing the content, whether it should be saved and reviewed later, or whether it should be discarded, for instance. In such a manner, tags, subject lines, and the like have become useful to reduce the time required in perusing online communication.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject matter disclosed and claimed herein, in various aspects thereof, provides for automated generation of tags (e.g., metadata descriptors) for items of e-mail or syndication formatted communication. Components of a system can include a filtering component that can generate one or more tags based on information relevant to content of the communication, a sender, or recipient, or combinations thereof. In addition, a presentation component can furnish the tags to a recipient (e.g., by way of a communication device user interface) for selection, whereby selected tags are associated with the item of communication. Accordingly, the subject innovation provides for improved classification and description of items of communication by automatic generation of tags associated with such items.

In accord with additional aspects of the claimed subject matter, machine learning and trained classifiers can be employed to generate tags relevant to and/or representative of one or more items of communication. Such tags can be relevance ranked as a function of relatedness to determined criteria, including item content, tags most recently used by a sender and/or recipient, user-defined preferences, one or more user profiles, or the like. Tags can be sorted as a function of relevance ranking, and automatically attributed to one or more items of communication, or presented to a recipient for selection. By employing machine learning techniques, the subject innovation can greatly improve the speed and accuracy with which tags can be generated and associated with items of communication.

In accordance with further aspects of the subject innovation, a plurality of items of communication can be grouped according to tags automatically generated and associated with such items. The tags can be determined in accord with machine learning techniques specified herein, and either automatically associated with such items or chosen by a recipient. Furthermore, searching components can identify and retrieve stored items of communication as a function of relevance of a tag to search criteria. In conjunction with such techniques, the claimed subject matter can facilitate organization and presentation of groups of items of communication as a function of descriptive tags.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
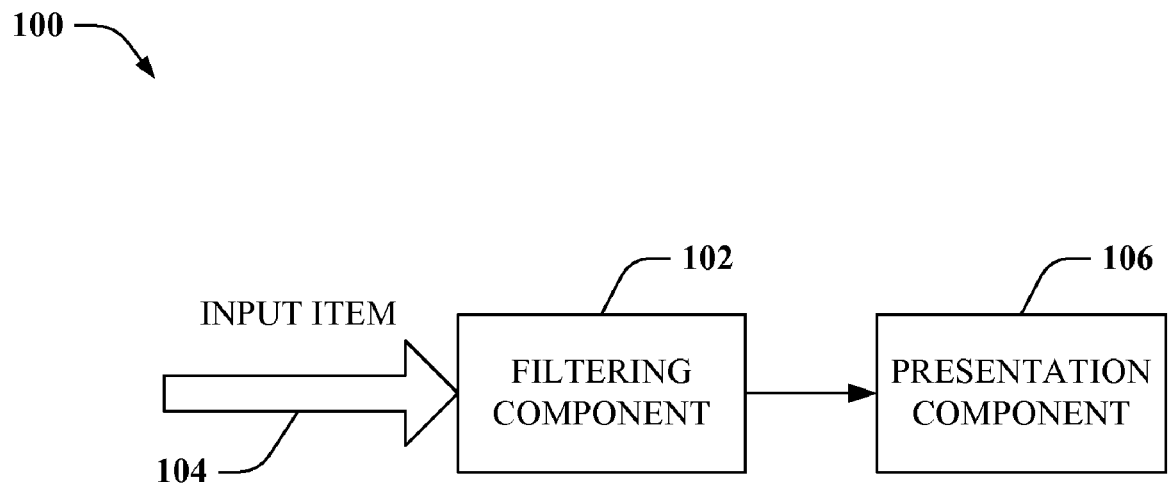
FIG. 1 illustrates an example system that automatically generates tags for items of communication in accord with aspects of the claimed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring to FIG. 1 an example system 100 is depicted that can automatically generate tags for items of communication in accord with aspects of the claimed subject matter. System 100 can facilitate efficient tagging of the items by generating tags descriptive and/or representative of such communication, and automatically assigning the tags to one or more such items, or presenting the generated tags to a recipient for approval. Items of communication can include e-mail and/or syndication formatted electronic transmissions.

Filtering component 102 can automatically generate one or more information tags for an input item 104, where such tags can be descriptive of and can classify item 104 and can be determined from data related to a sender, a recipient, or at least a portion of content of item 104, or combinations thereof. For instance, filtering component 102 can be included within an e-mail management system (not depicted) that can at least receive and present e-mail to a device user (e.g., via a user interface of a device, such as a graphical display and/or an audio announcement, device visual indicator such as an LED, or the like). As another example, filtering component 102 can be part of a syndication feed parser (not depicted), that can at least receive a stream of syndication formatted data and present the received data to a device user. As a further example, filtering component 102 can be an independent process, program, thread of execution, or the like, or suitable combinations thereof, included on a computing device (e.g., personal computer, personal digital assistant (PDA), laptop, mobile device, mobile phone, dual-mode device, gaming device, networked gaming device, server, terminal station, or the like or combinations thereof). It should be appreciated that filtering component 102 can be associated with other electronic components other than those articulated herein, and such components known in the art or made known to one of skill in the art by way of the examples articulated herein are incorporated into the subject disclosure.

Filtering component 102 can analyze portions of input item 104 to determine information relevant to content of item 104, a sender, and/or a recipient. For instance, filtering component 102 can analyze a subject line, sender identity, recipient identity, a tag (as defined herein and/or known in the art) specified by the sender that accompanies the e-mail communication (104), or the like, of an incoming e-mail communication (104). Keywords that are descriptive and/or representative of content, a subject, a topic or the like can be extracted by filtering component 102 and associated with a tag for that item 104.

As a more specific example, text within a portion of an e-mail communication (104), such as a subject line, etc., appearing frequently within a portion of the e-mail can be associated with one or more tags and given a relevance factor. The relevance factor can indicate a degree to which the generated tag is descriptive and/or representative of the input item 104. The relevance factor can be computed according to a frequency of occurrence within an item, for instance (104). Furthermore, portions of the e-mail (104) can be weighted more heavily than other portions. For instance, text within a subject line can be weighted preferably to text within a body of the e-mail. Text occurring more frequently and/or appearing in a particular portion of the e-mail can be associated with one or more tags and weights. Additionally, tags included with the e-mail communication (104) provided by the sender can be incorporated into one or more tags generated by filtering component 104 (e.g., see FIG. 2, infra, for a more detailed discussion of recently used and/or specified tags). Moreover, a tag list compiled by a recipient can be referenced, wherein generated tags are weighted as a function of relatedness to tags and/or communication terms, descriptors, classifiers, or the like, specified within such list.

As an additional example, if an item 104 references skiing, ski equipment, ski facilities, ski lodging, and/or the like for instance, filtering component 104 can generate tags such as 'skiing', 'sports', 'travel' or the like. Each tag can be weighted at least in accord with a place/frequency of occurrence of related text, or association with a sender tag, or a recipient classifier list, or like mechanism described herein. As another example, if an item 104 references a lawsuit, a patent application, a court, a judgment, information relating to a United States Patent and Trademark office action, a name of a law firm, contains the word 'lawyer', 'esquire', 'Esq.', etc., and/or the like, filtering component 104 can generate tags such as 'legal', 'patent', or the like. As a result, word occurrences in the communication or related to content, sender(s), or recipient(s) as described herein can be changed (e.g., translated or transformed) and/or incorporated into words, phrases, terms or the like that represent an inferred category. Such a category can be logically related to a topic, context, purpose, etc., of those word occurrences. As stated above, such tags can be weighted in order of relevance to an input item of communication 104.

In accordance with particular aspects of the claimed subject matter, system 100 can automatically associate a tag(s) with an item or present the tag(s) to a recipient for approval of such assignment. Tags can be automatically associated if they have a relevance factor higher than a predetermined threshold (e.g., tags having a relevance factor greater than 'x', for instance, where 'x' can be a variable representing a threshold relevance factor, or a default number of tags, 5 for instance, that have a relevance factor higher than a threshold can be automatically associated). Specifically, a presentation component 106 can furnish one or more tags to a device user. Presentation component 106 can display tags automatically assigned to an item (104), and/or tags generated by filtering component 102 but not yet assigned to the item (104) (e.g., tags below a threshold or above a default number, or if user preferences disable automatic tagging, for instance). For example, presentation component 106 can display a list of tags (e.g., on a user interface display, see FIG. 4, infra) if an item 104 is selected by a recipient and/or device user. The list can include tags generated by filtering component 102 with respect to the item 104, in order of decreasing relevance factor, for instance. As an example, a tag weighted highest (e.g., most representative and/or descriptive of item 104) can be displayed first, and a tag weighted lowest (e.g., least representative/descriptive) can be displayed last.

A tag furnished and selected by a recipient can then be associated (e.g., attached within an x-header of an e-mail message, see FIG. 3, infra, for more detail) with a stored version of an item 104 (e.g., an e-mail or syndication feed stored in memory of a device utilized to view, parse, receive, etc., the electronic communication). Furthermore, multiple tags selected by the recipient can optionally retain a weight provided by the filtering component, and such weight can be used to distinguish tags associated with the item 104 (e.g., tags can be colored, highlighted, underlined, an auditory sound can be played indicating weight and/or relevance, a display indicator can light up, an auditory sound can be emitted, or like user interface mechanism to distinguish between one tag and another). Additionally, or alternatively, an order in which a user selects a tag can optionally be retained and utilized to distinguish such tags. Tags associated to an item of communication can be indicated on a device user interface by presentation component 106 (e.g., displayed on a display, etc.)

If tags are automatically assigned to input item 104 by filtering component 102, presentation component 106 can also display such tags to a device user. For instance if a stored item 104 is selected (e.g., on a user interface display, see FIG. 4), presentation component can display the tags associated with the item 104. It should also be appreciated that system 100 can be activated and/or deactivated by a device user to facilitate enabling/disabling the generation and display of tags. In addition, a user can specify whether some, all, or no tags are to be automatically assigned by filtering component 102, or presented for approval before such assignment.

It should be further appreciated that input item 104 can include e-mail communication as well as syndicated content (e.g., via a syndication protocol). A source or protocol of such syndicated content can include at least rich site summary (RSS 0.91) formatting, resource description framework (RDF) site summary (RSS 0.90 and 1.0) formatting, or really simple syndication (RSS 2.0) formatting, or combinations thereof or of like formats. It should be appreciated that syndicated content as described herein is not limited to the foregoing protocols, however. In addition, such RSS content can include web-based blogs, webpage information, streaming webpage data, streaming RSS data transfer, or the like that contain a full text and/or a summary of content from an associated publisher. System 100 can receive such an input item 104 via various mechanisms known for receiving such e-mail and/or RSS communication known in the art or made known to one of skill in the art by way of the embodiments articulated in the subject disclosure.

It should additionally be appreciated that a tag, as used herein, can include any suitable keyword, key phrase, and/or key term associated with or assignable to an e-mail and/or RSS item of communication (104). The tag can typically be descriptive of, representative of, and/or suitable for classifying such communication (104). Single word tags as well as multi-term tags can be included within the meaning of 'tag' as used herein. In addition, tags can be formed of slang words, symbols, hyphenated words, shortened words (e.g., as demonstrated by shorthand) or the like. In general a tag as described herein is intended to be descriptive or representative of content of an item of communication so as to provide some purpose, subject, topic, or the like associated with the item by a quick visual and/or auditory review of the tags associated with such item.

Figure 2:
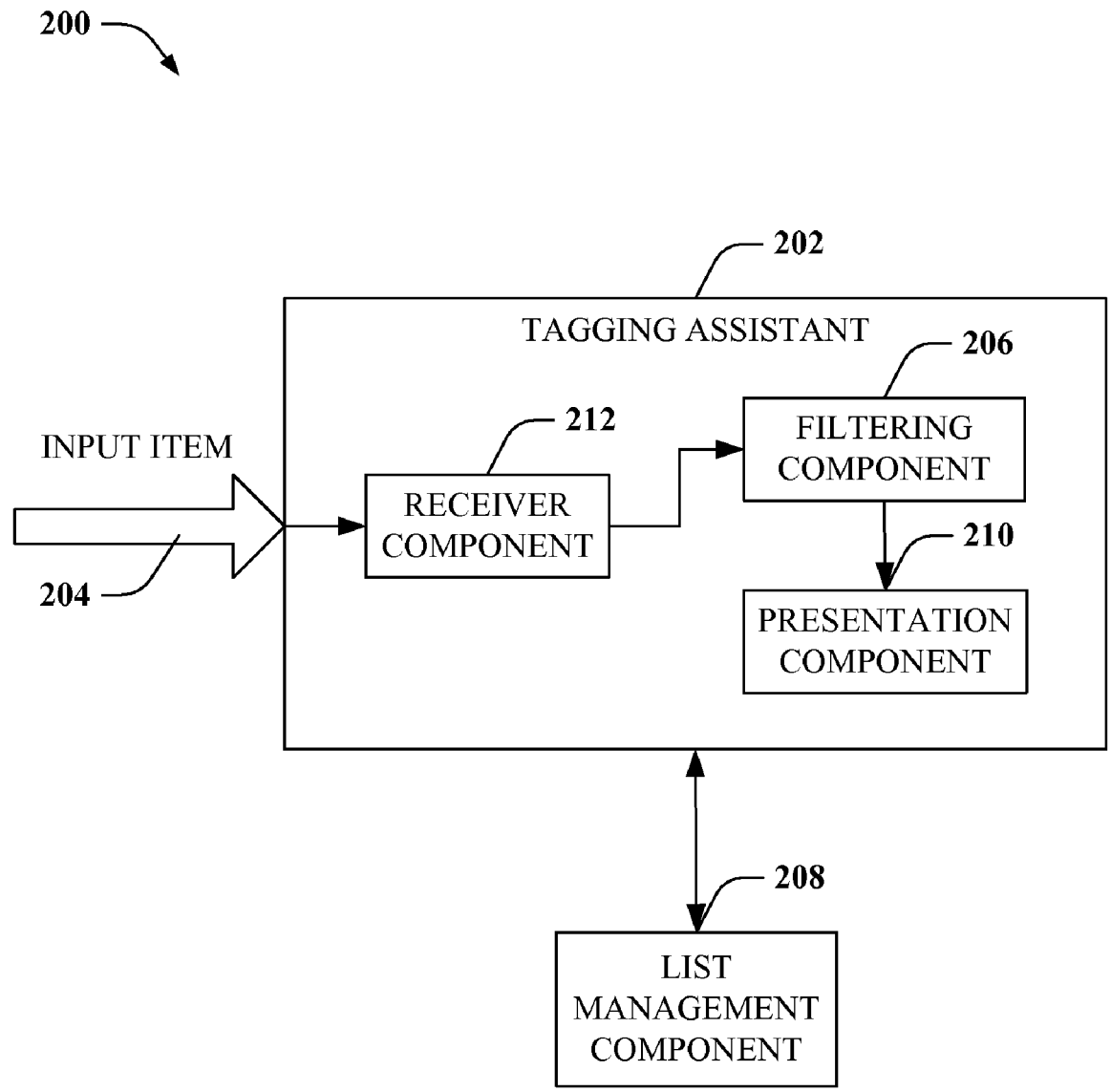
FIG. 2 depicts an example system that can utilize most recently used tags of a sender or recipient in conjunction with automatically generating tags for items of communication.

FIG. 2 depicts an example system 200 that can utilize most recently used tags of a sender or recipient in conjunction with generating tags for e-mail and/or RSS communication. A tagging assistant 202 can accept an input item 204 at a receiver component 212. The input item 204 can include one or more instances of e-mail or RSS communication such as a web blog feed, webpage feed, or other syndicated, published online communication. The tagging assistant can generate one or more tags that can be automatically attached to the item of communication 204 (e.g., as extended information or metadata, such as an x-header of an e-mail) or presented to a user for approval of such attachment. Specifically, a filtering component 206 can analyze portions of the input item 204 (or, e.g., of multiple input items, or of a subset of all input items stored in memory for a communication device, communication application, or the like) and can determine one or more tags representative of and/or descriptive of the item 204. In addition, tags can be determined from information related to content, sender(s), recipient(s), etc., of all communication items inside a communications device, applications, or the like. Such tags can be considered global tags, relative to at least the device or application, etc. Tag determination can be based at least in part on data related to content of the input item 204 (e.g., a subject line, message body, metadata, header information, or the like, of the input item or of multiple input items), a sender, or a recipient of such item(s) 204, or combinations thereof. In addition, tags can be generated based on tags most recently used by a recipient, contained within a list management component 208.

List management component 208 can store and maintain lists of tags recently utilized by one or more device users in conjunction with prior received items of communication. In addition, list management component 208 can store simple user-specified lists of tags unrelated to prior association with items of communication. Furthermore, list management component 208 can distinguish between most recently used tags, utilized by the recipient, as a function of sender of input item 204. For example, tags assigned to an e-mail item (204) sent by sender A can be grouped into a Sender A most recently used tag list. Any subsequent tag associated with an item of communication (204) sent by Sender A (e.g., assigned automatically by tagging assistant 202 or presented to and approved by a user, for instance) can be appended to the Sender A most recently used tag list. In a like manner, lists can be generated by list management component 208 including tags associated with input items 204 sent by other senders.

Filtering component 206 can utilize tags contained within a most recently used tag list (e.g., either a simple, generic list provided by a recipient, or a sender-specific list) to generate and weight one or more tags for an input item of communication 204. For example, if an RSS item 204 is received, filtering component 206 can reference list management component 208 to determine if any tags have been associated with prior messages sent by a sender of the RSS item 204. Such prior tags can form the basis for one or more new tags generated for the RSS item. In addition, tags recently associated with a sender's communication can be given a higher (or, e.g., lower weight if specified as such by a user) weight than tags not included within such a list. For instance, a default relevance modifier can be established for sender-specific tags that can be added to any baseline relevance factor provided by filtering component (e.g., as a result of frequency of occurrence of a tag, occurrence of a tag within a subject line or the like, etc., as discussed supra at FIG. 1). Tags associated with the recently received RSS item can then be added to a most recently used tag list maintained by filtering component 206 for the sender of the RSS item.

If a communication 204 from a first-time sender is received by tagging assistant 202 (e.g., the sender has not previously sent an e-mail or RSS message to a recipient/user), or if list management component 208 has not previously compiled information pertaining to a particular sender, then a simple list of recipient specified recently used tags can be utilized to generate and weight tags. The simple list can be a sender independent list of preferred tags established by a recipient and maintained at list management component 208. For instance, a recipient may have particular interests in the following tags: "work-related", "travel", "Dow Jones", "Fortune 500", "camping", and "backpacking", independent of message sender. Such list can be utilized by tagging assistant 202 to generate and/or weight tags for any suitable input item 204. For instance, the tags can form a baseline from which to determine relevancy of terms in a communication. Furthermore, the sender specified tags can be provided a default relevance modifier to be added to any baseline relevance factor generated by filtering component 206.

List management component 208 and filtering component 206 can utilize a simple preferred list of tags in conjunction with sender-specific most recently used tags, discussed above, where appropriate. By default, sender-specific tags can be provided a higher default relevance modifier (e.g., as discussed above at FIG. 1, supra) by filtering component 206 (e.g., commonalities between a prior and concurrent communication could more likely be subject or topic related) than generic user-specified tags. Optionally, a device user/recipient can change such default relevance modifiers on a per tag basis in a user interface of a device.

System 200 can display tags associated with input item 204 to a device user, either automatically attached to such item 204 or as a list of tags that a user can choose to attach. In addition, such display can be in order of decreasing relevance factor determined by filtering component 206. In such a manner as described above, system 202 can utilize sender-specific and user specified tags to facilitate understanding, use, and management of e-mail and/or RSS communication.

Figure 3:
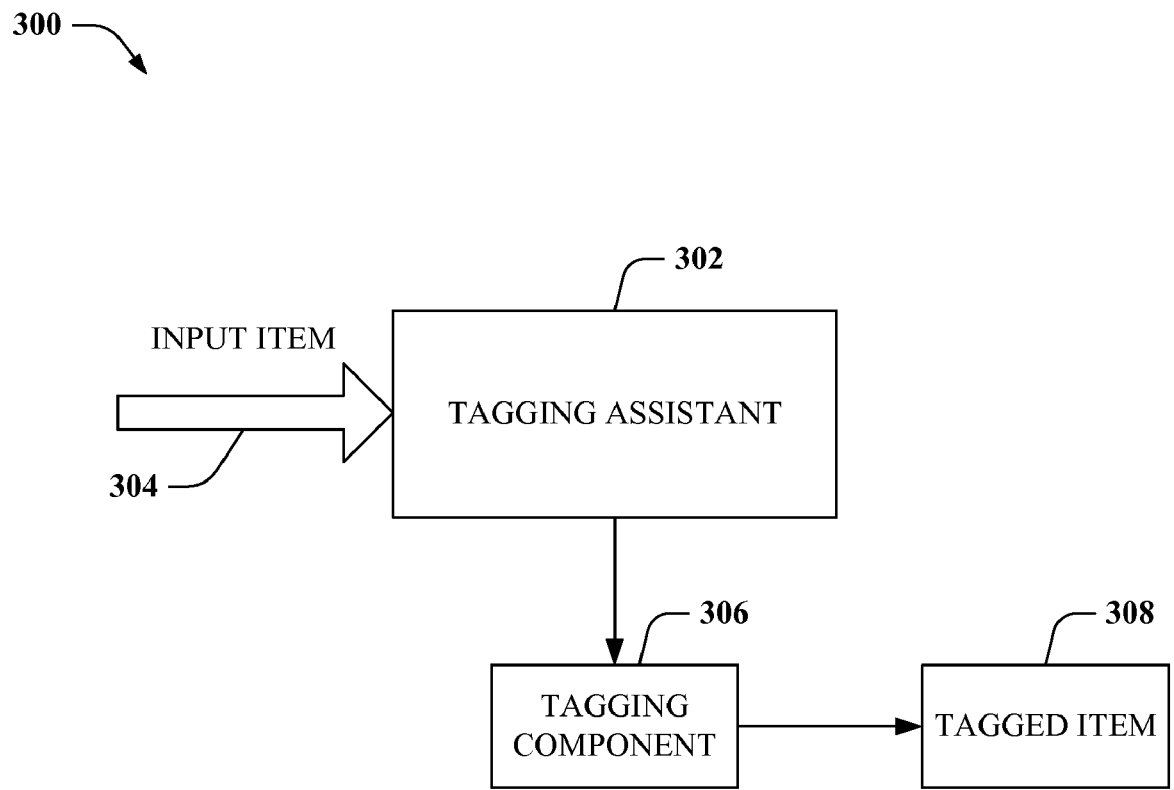
FIG. 3 illustrates an example system that generates and associates tags with one or more items of communication in accord with aspects disclosed herein.

FIG. 3 illustrates an example system that can generate and associate tags with one or more items of communication in accord with aspects disclosed herein. Tagging assistant 302 can generate and weight tags (e.g., with a relevance factor) associated with an input communication item 304. Such tags can be descriptive/representative of message (304) content, and can be generated from data related to such content, a sender, and/or a recipient of the message (204), including sender-specific and user specified tag lists (e.g., as discussed above at FIG. 2). Input item can include both e-mail communication as well as syndication formatted web feeds, such as any suitable RSS or RSS-type communication.

System 300 can further associate generated tags with an input item 304 such that generated tags are transmitted with the communication item (204) and can be quickly viewed by a recipient for a quick visual summary of item (204) content. Additionally, tags can automatically be assigned to an item (204) or can be assigned upon specific recipient approval. A tagging component 306 can receive tags and related weights generated by tagging assistant 302. Such tags can be associated with an input item 204. For instance, tags can be included as attached metadata and/or extended information within the communication itself (e.g., as part of a data packet or sequence of data packets containing a message, stored within a portion of memory reserved for a communication, or the like) or external to the communication in a related and conjoined file (e.g., separate data packet, separate memory file associated with memory containing the communication, etc.) As a more specific example, a tag associated with an e-mail item can be incorporated as an x-header for that e-mail item.

Tagging component 306 can receive an item of communication 304 along with tags generated by tagging assistant 302. Tags automatically associated with the item 304 (e.g., that meet a default relevance threshold and/or fall within a default number) are attached as described above. Tags not automatically assigned to an input item 304 can be presented to a user by tagging assistant 302. If a user specifies that a tag is to be attached to the input item 304, tagging component can then attach the tag to the item 304 also as described above. The result is tagged item 308, that has one or more attached tags (e.g., within a file/packet stream associated with the item 304, or in a separate, related file, or like mechanism for associating metadata or extended information). The attached tags can be displayed and/or announced or otherwise indicated when a user selects an item of communication (e.g., selects an e-mail item in an e-mail browser, etc.) In such a manner system 300 can generate, weight, attach and display tags to incoming e-mail and/or RSS communication to facilitate quick audio/visual review of such received communication.

Figure 4:
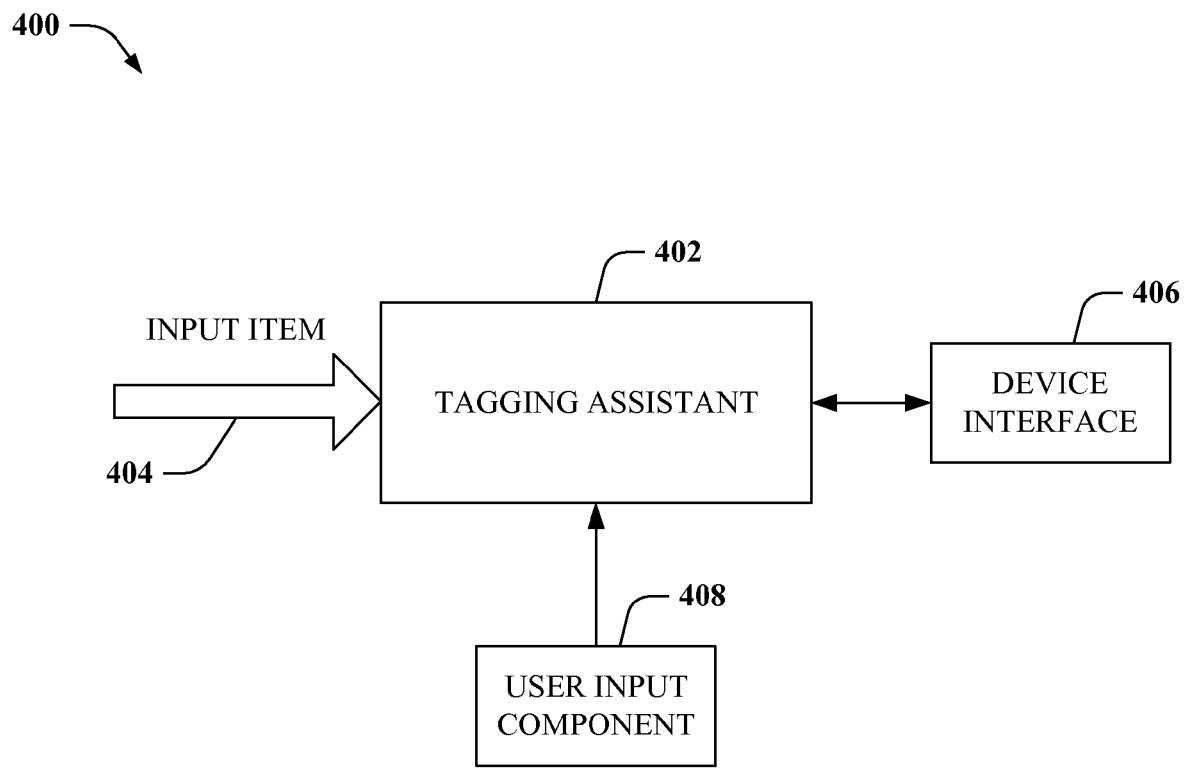
FIG. 4 depicts an exemplary system that can present tags for items of communication for selection by a user.

FIG. 4 depicts an exemplary system 400 that can present tags generated by a tagging assistant 402 to a user. Tagging assistant 402 can receive an input e-mail and/or RSS item of communication 404, automatically generate tags for that item, and relevance weight such tags as described herein. In addition, tagging assistant 402 can present the generated tags to a device user via a device interface 406. The device interface 406 can include a graphical user interface such as a liquid crystal display (LCD), plasma display, cathode ray tube (CRT) monitor, television, or the like, and can also include audio capabilities (e.g., speaker(s) and a hardware and/or software sound control mechanism such as a sound card and/or sound driver) and/or visual indication capabilities (e.g., light emitting diode (LED) indicators, or the like).

The device interface 406 can display tags generated by tagging assistant 402 on a graphical display, announce word tags, indicate special tags (e.g., tags included within a most recently used list, or user specified list, such as specified within a list management component, depicted at FIG. 2, supra, or global tags that are generated from information related to content, sender(s), recipient(s), etc., of all communication items inside a communications device, applications, or the like), and the like or combinations thereof. Tags can be graphically distinguished as well. For instance, tags can be highlighted, colored, shaded, emboldened, italicized, displayed in various fonts, or any suitable combination thereof or of the like. Additionally, an auditory mechanism can be played to further distinguish one or more tags and/or alert a recipient of particular tags, important tags, or the like. Such representation of tags can be utilized to provide a quick visual and/or auditory distinction for the special tags. As a more specific example, tags can be displayed within a pop-up box or list near a display of an item of communication (404), a mouse-over tip or the like, a folder, or similar mechanism. In such a manner system 400 can provide a quick visual summary of tags associated with one or more an input items of communication 404.

Tagging assistant 402 can also receive input from a device user as to whether one or more proposed tags should be associated with an input item 404. User input component 408 can receive user input and provide such input to tagging assistant 408. For instance, a keyboard, mouse, stylus, touch-pad screen, or the like can represent a selection or decision of a user. Such selection can be utilized, for instance, to approve association of a tag with an input item 404 and attachment of such tag to such item (e.g., via tagging component 306, at FIG. 3, supra). More specifically, tagging assistant can present one or more proposed tags to a device user via device interface 406. Presentation can be in order of decreasing relevance factor, as indicated herein, wherein a more relevant tag can be displayed first, displayed prominently, announced aurally, indicated visually, graphically distinguished, etc., as compared with tags determined less relevant (e.g., by filtering component 102, 202, supra).

Tagging assistant 402 will ultimately associate proposed tags with input item 404 by tagging assistant 402, if a device user approves of such association via user input component 408 (or a like, alternative input mechanism). Alternatively, or in addition, a device user can indicate user-specified tags that should be attached to an input item 404 via input component 408. Specifically, a user can type, or otherwise specify, a user-generated tag that is to be associated with the item 404. The user can also indicate a custom display/presentation mechanism for the user-generated tag, as discussed above. In such a manner as described above, system 400 can automatically generate tags and facilitate customized association of such tags with an input item 404 of communication.

Figure 5:
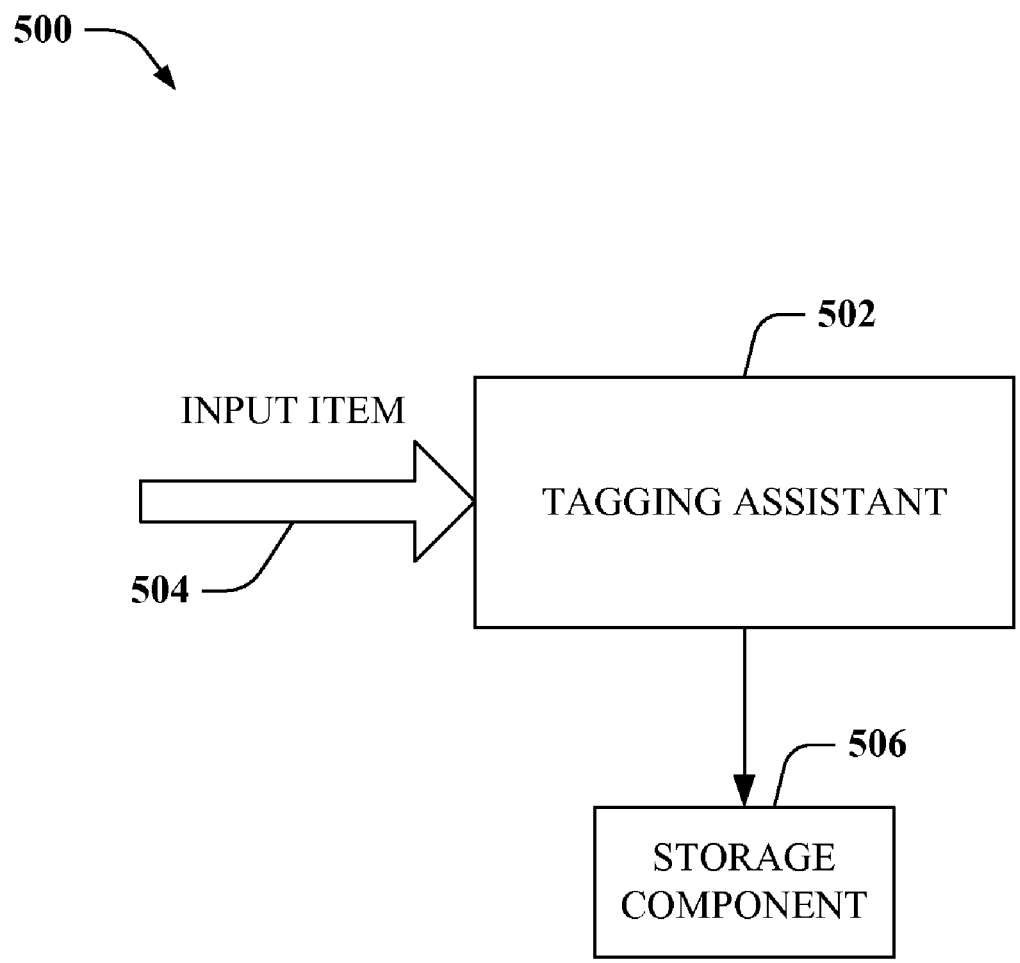
FIG. 5 illustrates a sample system that can store user preferences and generate/associate tags with items of communication in accordance with at least the stored preferences.

FIG. 5 illustrates a sample system 500 that can store user preferences and generate/associate tags for items of communication in accordance with at least the stored preferences. Tagging assistant 502 can receive an input item of communication 504, such as an e-mail or an RSS feed, and generate key phrase based tags for the item 504 as described herein. Such tags can be presented to a user for association with the input item 504, or automatically associated with the item 504.

System 500 can also utilize a list of user preferences stored within a storage component 506 to customize a generation, weighting, presentation, and/or association of tags with an input item 504. Storage component 506 can include any suitable physical and/or virtual electronic memory device, such as a hard disk, flash memory disk, including both volatile and non-volatile flash memory, universal serial bus drive, external hard drive, small computer system interface (SCSI) hard drive, serial drive, parallel drive, JAZ drive, floppy disk, memory module, network storage device, distributed storage device, server, database, distributed database, or the like, or combinations thereof. Storage component 506 can include a user preferences list for one or more users of a device. Such preferences can provide default specifications for tagging assistant 502.

User defined default specifications can provide defaults related to the generation and/or relevance weighting of tags. For example, defaults can establish whether sender information, recipient information, message body information, information in a subject, header, footer, or pre-existing metadata tag associated with an input item 504 or any suitable combination of these or like items should be utilized for generating recipient tags. Furthermore, such defaults can specify which factors have priority over other factors for tag generation. As a specific, non-limiting example, a user preference can specify that text in a subject line or included within extended information (e.g., metadata) should be given 3 times higher priority in identifying and articulating a tag than text in the body of a message. Preferences can also specify whether to generate tags based on sender-included tags associated with the item 504, and what priority to give such sender-included tags. Moreover, preferences can indicate whether to use a MRU tag list or user-specified tag list to generate tags, and what priority to give such criteria (e.g., as discussed at FIG. 2, supra).

As a specific example, user preferences saved on storage component 506 can indicate that information contained within a recipient field of a message (e.g., a "To" field or "Target" field, or the like, of an e-mail message) in order to generate a 'spam' tag. Specifically, if the recipient's information, such as e-mail address, IM address, SMS address, or the like, is not specifically identified within a recipient field of an input item 504, then tagging assistant 502 can generate a 'spam' tag (e.g., indicating that the input item 504 may be from a mailing list or like source), and either associate it with the item 504 and/or present it to a device user as a proposed tag. Alternatively, or in addition, preferences can instruct tagging assistant 502 to search recipient(s) of the item to see if any stored tags (e.g., contained within list management component 208) are associated with the recipient(s). Such recipient-specific tags can also be utilized to generate an associated or proposed tag by tagging assistant 502.

As an additional example, user preferences can also establish defaults for generating a MRU tag list (e.g., by list management component 208) for individuals or for groups. Specifically, a group list can established for a group address, or individual MRU lists can be established for individual senders/recipients of a group, or a combination of both. For instance, tags associated with each member of the group can be attributed to the group MRU, and/or vice versa. Tagging assistant 502 can then utilize tags associated with groups of senders and/or recipients associated with a communication in order to generate and/or relevance weight tags in accordance with user preferences stored at storage component 506.

User preferences, as described herein, can also be utilized to customize relevance factors associated with tags. As discussed at FIG. 1, supra, a filtering component 102 and tagging assistant, such as depicted at 502, can generate a factor for each tag indicating a degree to which the tag is representative and/or descriptive of content of an input item 504. Such weighting can utilize linguistic, word frequency, association, and place of occurrence identifiers, and algorithms relating such entities, to generate the relevance factors. Additionally, user preferences can customize the particular factors utilized in generating weights and the degree to which a particular factor is utilized by an algorithm (e.g., a scalar or dependent variable ratio associated with different factors can be established in accord with a user preference to customize a weight of one or more such factors).

In addition, user preferences can establish defaults related to whether and what type of tags to automatically associate with an input item 504, if any, and whether and what type of tags to request user permission before association with the input item 504. Moreover, a threshold number of tags and/or a threshold relevance factor required to auto-associate one or more tags (e.g., without user input) with an input item can be established within user preferences. In addition, user preferences can specify a manner in which to display tags associated and/or presented to a device user (e.g., whether highlighted, shaded, colored, emboldened, italicized, displayed in various fonts, whether announced aurally, indicated visually or the like, including any suitable user interface preference specified at FIG. 4, supra, or known in the art). Furthermore, user defaults can establish whether tagging assistant 502 is to be enabled or disabled at a given point in time.

It is to be appreciated that the example embodiments described in relation to storage component 506 and user preferences contained thereon (and, e.g., as related to all example embodiments articulated in the subject disclosure) are non-limiting embodiments. Consequently, the particular embodiments articulated herein as well as those known in the art, or made known to one of skill in the art by way of the context provided by the subject disclosure is incorporated herein. By virtue of the foregoing, system 500 can facilitate customized tagging of input e-mail and/or RSS communication in accord with aspects of the claimed subject matter.

Figure 6:
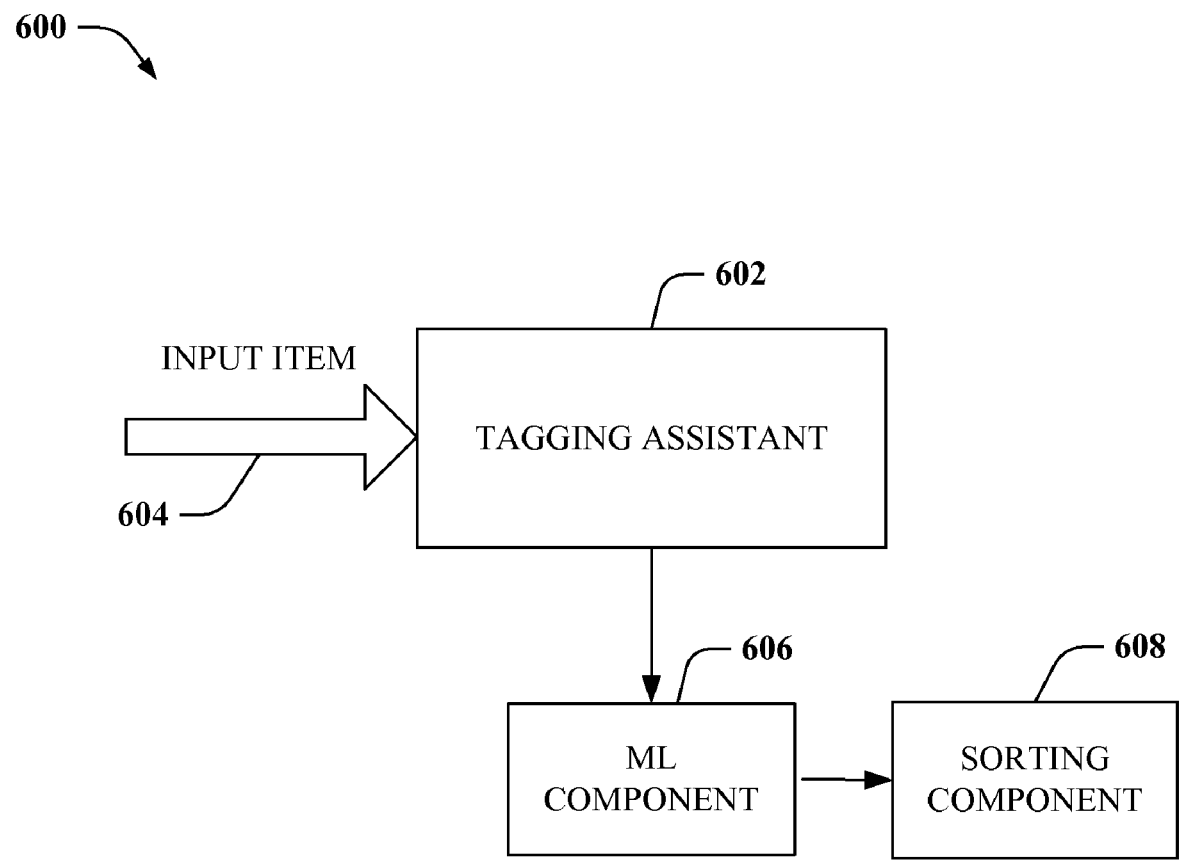
FIG. 6 depicts an example system that employs machine intelligence to relevance rank communication tags.

FIG. 6 depicts an example system that employs machine intelligence to generate and/or relevance rank communication tags. Tagging assistant 602 can receive an input e-mail and/or RSS item of communication 604, and reference a machine learning (ML) component 606 (or, e.g., artificial intelligence AI) to generate and/or relevance rank suitable tags for such item(s) 604. Specifically, such machine learning (ML) component 710 can store and reference information related content of prior messages of a sender, tags sent previously by the sender, preferred tags established by a device user/item recipient, user specified preferences, or the like or combinations thereof. As an example, a recipient can have stored preferences (e.g., saved on a storage device 608) indicating various preferences related to generating, relevance ranking and/or displaying tags to a device user (e.g., as discussed in more detail at FIG. 5, supra). ML component 606 can reference such stored defaults, preferences, or user history, for instance, associated with one or more senders and/or recipients and strategically generate one or more tags representative and/or descriptive of an input item 604 and relevance factors for such tags. Such generation can facilitate, for instance, optional auto-association of tags to input items 604, or proposed tags for indication by a device user, or like procedure. In such a manner, system 600 can increase speed, efficiency, and accuracy of item tagging in accord with aspects of the claimed subject matter.

To make strategic determinations the ML component 606 can utilize a set of models (e.g., recipient preference model, input item history model, general MRU tag models of senders and/or recipients, etc.) in connection with generating and ranking tags. The models can be based on a plurality of information (e.g., user specified preferences, prior tags generated for related input items, prior proposed tags approved by a device user, tags associated with various recipients, senders, or sender/recipient groups, frequency of occurrence of terms in an item, position of occurrence, attached metadata or extended information, etc.) Optimization routines associated with ML component 606 can harness a model that is trained from previously collected data, a model that is based on a prior model that is updated with new data, via model mixture or a data mixing methodology, or simply one that is trained with seed data, and thereafter tuned in real-time by training with actual field data during receipt of incoming items or customized tag generation by a device user, or data compiled from networked device users, if applicable.

In addition, ML component 606 can employ learning and reasoning techniques in connection with making determinations or inferences regarding optimization decisions and the like. For example, ML component 606 can employ a probabilistic-based or statistical-based approach in connection with choosing between potential tags associated with an input item, optionally auto-assigning tags to input items 604, or offering proposed tags as a function of relevance rank, determined in accord with user preferences, etc. The inferences can be based in part upon explicit training of classifier(s) (not shown) before employing the system 702, or implicit training based at least upon a device user's previous input, choices, and the like during use of the device. Data or policies used in optimizations can be collected from specific users or from a community of users and their devices, provided by one or more device service providers, for instance.

ML component 606 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by one or more structure searches using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. As a non-limiting example, classifiers can be trained on a set of tags and input items approved of and/or generated by a user, as described herein. As more items are labeled by a particular user, the classifiers can be retrained. When an item is received (or, e.g., displayed/presented to the device user) system 600 can execute one or more classifiers to generate tags and relevance ranks. Sorting component 608 can arrange tags in accordance with relevance rank determined by the classifier(s). Tagging assistant 502 can then display tags as a function of relevance rank determined by the classifier (e.g., as a confidence score or probability).

Methodologies employed by ML component 606 can also include mechanisms for the capture of logical relationships such as theorem provers or more heuristic rule-based expert systems. Inferences derived from such learned or manually constructed models can be employed in optimization techniques, such as linear and non-linear programming, that seek to maximize some objective function. For example, generation of input item tags as a function of descriptiveness and/or degree of representation of content of the item, degree of adherence to user defined preferences, as described herein, incorporating user tag generation/approval history, as well as like factors suitable for such optimizations.

Figure 7:
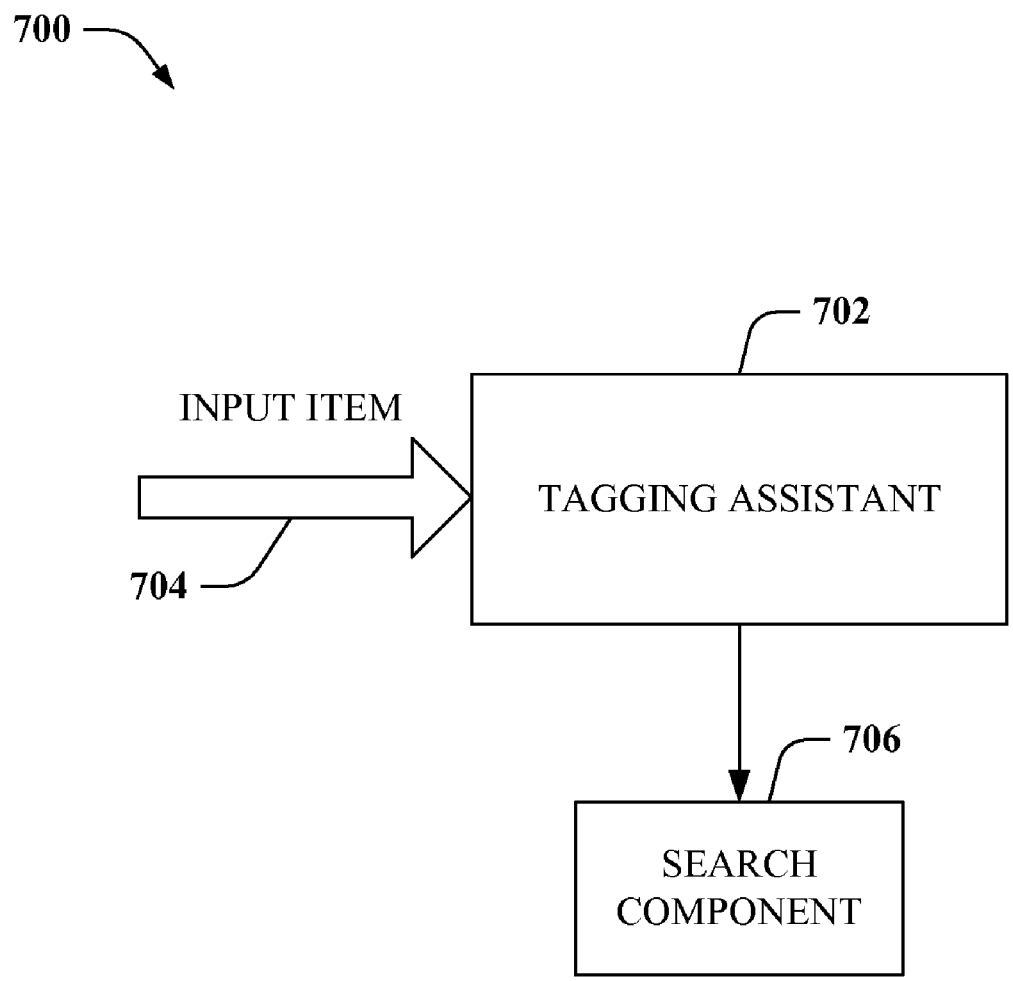
FIG. 7 illustrates a sample system that can search stored items of communication based on automatically generated tags in accordance with embodiments disclosed herein.

FIG. 7 illustrates a sample system that can search stored items of communication based on automatically generated tags in accordance with embodiments disclosed herein. As discussed previously, tagging assistant 702 can receive one or more e-mail and/or RSS input items 704 and automatically generate, relevance rank, associate and/or display one or more tags for such items 704. Tags as defined herein are typically articulated in order to describe and/or represent content of the input item 704. Furthermore, tagging can be in accordance with user preferences, and trained on machine learning models and object classifiers to facilitate custom and efficient processing of such tags, as described herein. Subsequent to tagging and associating tags with items of communication 704, the items and tags can be saved in memory (not shown) associated with a computing device, communication device, gaming device, etc.

Search component 706 can facilitate searching and identifying a plurality of saved items of communication based on one or more tags associated with the instances of communication. A user can input criteria (e.g., text, word, phrases, symbols, etc.) and search component can identify items having tags related to the criteria. For example, a search component can identify all saved items having a tag titled or related to 'skiing', or the like. Any suitable text and/or symbol-based search mechanism can be incorporated by search component 706. In addition, search component 706 can sort identified items based on relevancy of the one or more tags to the input search criteria. Items can then be displayed by tagging assistant 702 as a function of exact match, relevancy or the like. In such a manner, system 700 can facilitate organization, searching, and display of items of communication via descriptive/representative tags as described herein.

The aforementioned systems have been described with respect to interaction between several components. It should be appreciated that such systems and components can include those components or sub-components specified therein, some of the specified components or sub-components, and/or additional components. For example, a system could include tagging assistant 302, ML component 608, and search component 706 or a combination of these and other components. Sub-components could also be implemented as components communicatively coupled to other components rather than included within parent components. Additionally, it should be noted that one or more components may be combined into a single component providing aggregate functionality. For instance, tagging assist 602 or ML component 606 can include sorting component 608, or vice versa, to facilitate generation, sorting, and/or display of tags via a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 8:
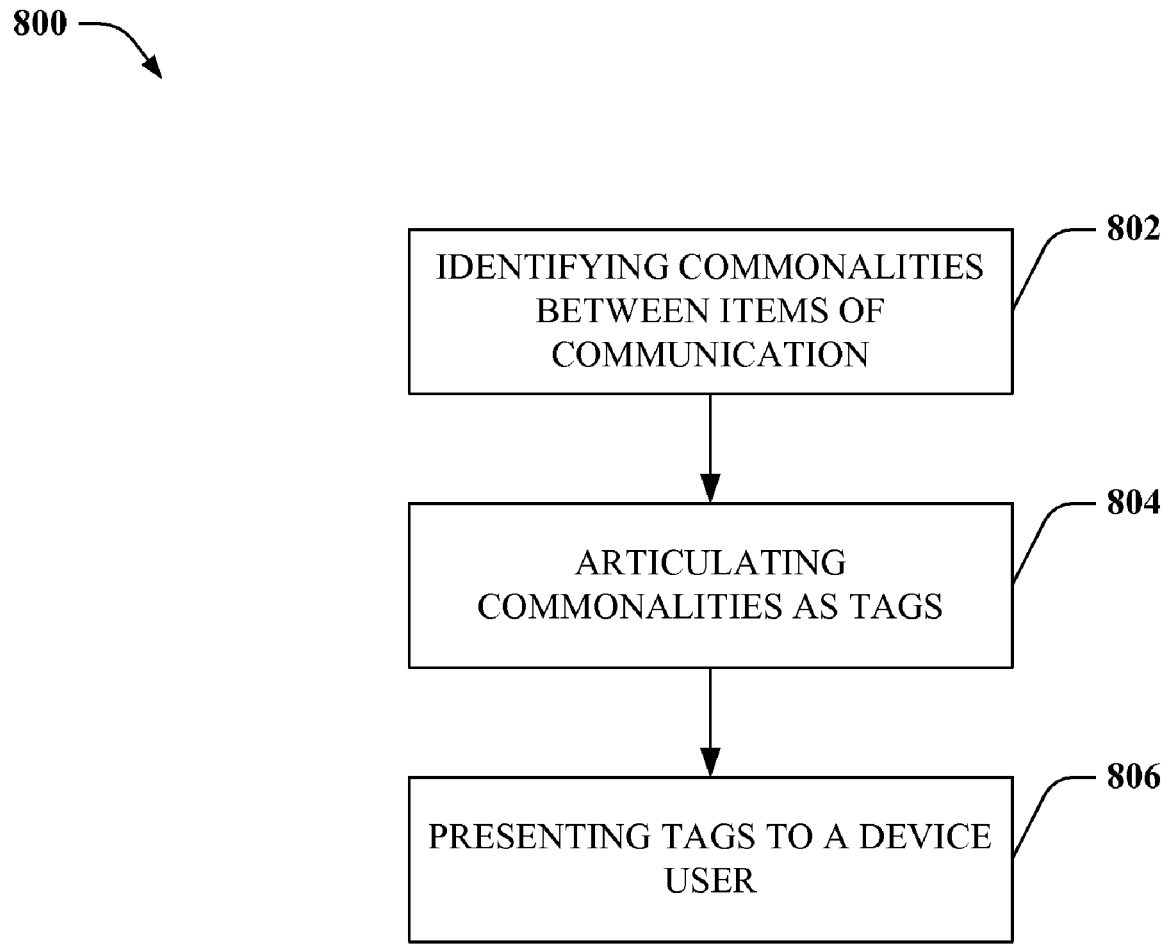
FIG. 8 depicts an exemplary methodology for generating and associating tags with groups of items of communication in accordance with aspects of the claimed subject matter.

Referring to FIG. 8, an exemplary methodology 800 is depicted for generating and associating tags with groups of items of communication in accordance with aspects of the claimed subject matter. At 802, commonalities between received items of communication can be identified. Such received items can include e-mail communication as well as syndication formatted communication such as RSS (e.g., including at least RSS 0.91 formatting, RSS 0.90 and 1.0 formatting, or RSS 2.0 formatting, or combinations thereof or of like formats). RSS formats can include web-based blogs, webpage information, streaming webpage data, streaming RSS data transfer, or the like that contain a full text and/or a summary of content from an associated publisher. Commonalities between received items can include text contained in a subject line, portions of a message body particularly descriptive and/or representative of an item, data associated with a sender(s) (e.g., sender identity, tags included by a sender, or the like), or data associated with a recipient(s), or data associated with groups of senders/recipients, or like information or combinations thereof.

At 804, identified commonalities can be articulated as tags. Such tags can include any suitable keyword, key phrase, and/or key term associated with or assignable to items of communication received at reference number 802. In addition, the tag can typically be descriptive of, representative of, and/or suitable for classifying such items. Single word tags as well as multi-term tags can also be included. Furthermore, tags can be formed of slang words, symbols, hyphenated words, shortened words (e.g., as demonstrated by shorthand) or the like. Typically a tag is useful to describe or represent content of an item of communication so as to provide some purpose, subject, topic, or the like associated with the item via a quick visual and/or auditory review of one or more tags associated with such item.

At reference number 806, one or more tags are presented to a device user. For instance, the tags can be presented as proposed tags that a user can choose to associate with one or more received items. Alternatively, or in addition, the tags can be automatically attached to a received item(s) (e.g., up to a threshold number) and presented to a user as pop-up tabs, or mouse-over dialogue boxes, displayed when an associated received item of communication is selected by the user. Optionally, received items can be displayed as a function of common tags. For instance, an e-mail folder can be generated and populated with all items assigned a particular tag by methodology 800. In addition, or alternatively, items can be displayed in an 'Inbox' (or, e.g., other folder containing items sorted by a user) as a function of such tags. In such a manner, methodology 800 can generate and display tags representative of commonalities between groups of received items to facilitate organization of such items.

Figure 9:
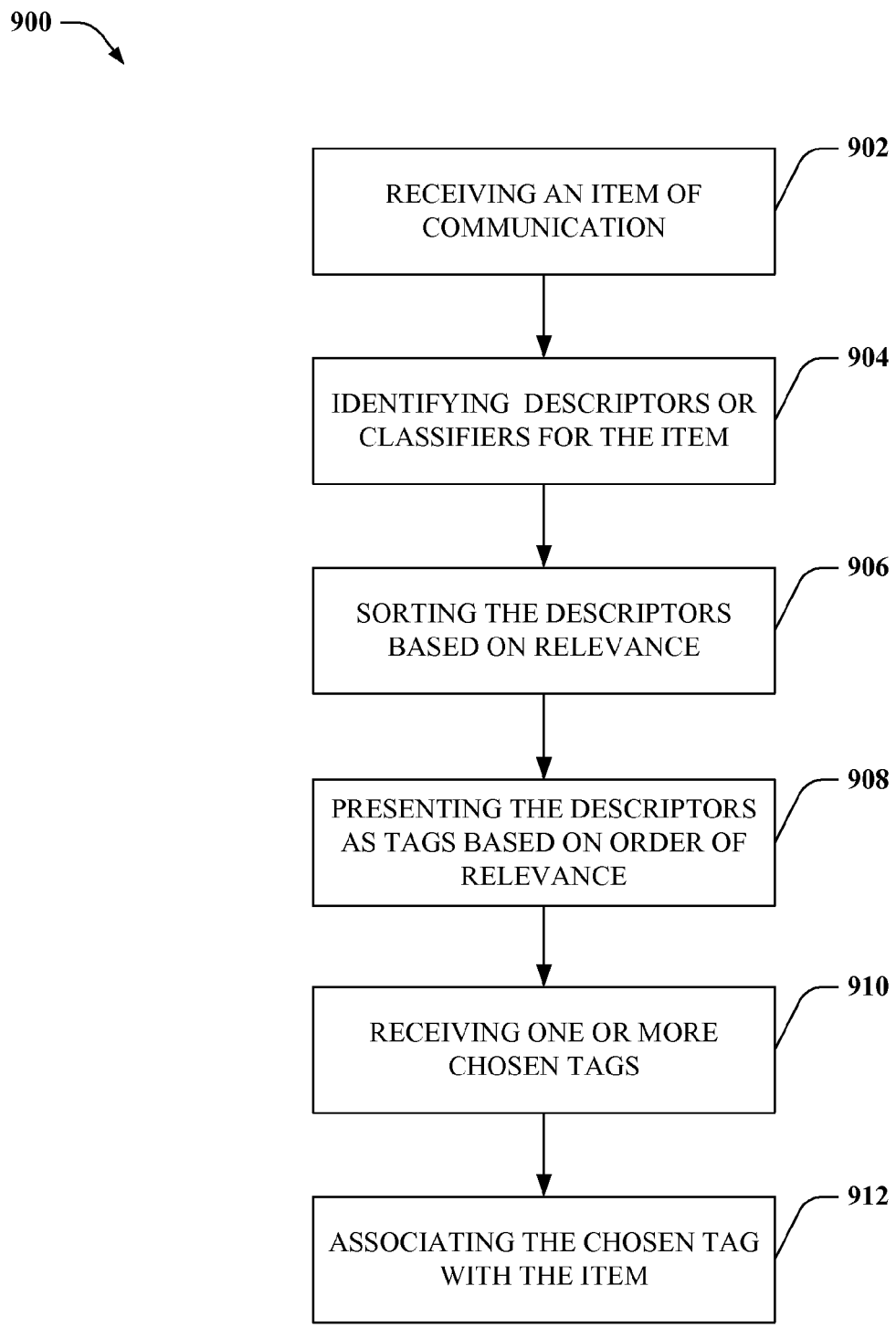
FIG. 9 illustrates an example methodology for utilizing descriptors associated with an item of communication to generate related tags in accordance with aspects disclosed herein.

FIG. 9 illustrates an example methodology 900 for utilizing descriptors associated with an item of communication to generate appropriate tags for such item. At 902, an item of communication can be received (e.g., in an e-mail inbox, or at an RSS feed parser, or device containing such items, or the like). At 904, descriptors and/or classifiers for the item can be identified. Descriptors and classifiers can include text, symbols, or the like transmitted within an item or in conjunction with an item contained within a message body, subject line, extended information file, metadata line, header, or the like. Also included is information pertinent to a sender(s) or a recipient(s), such as a tag generated and transmitted with the item. At 906, the descriptors and/or classifiers can be sorted based on relevance to message content. A relevance rank can be assigned each descriptor/classifier as a function of description and/or degree of representation of the content of a received item, as described herein. At 908, the descriptors can be presented as tags based on order of relevance (e.g., via a user interface of a device). At 910, one or more chosen tags can be received (e.g., specified by a device user via a device input mechanism, such as a keyboard, mouse, stylus, or the like). At 912, the chosen tags can be associated with the item of communication received at reference number 902. As described, methodology 900 can facilitate customized of automated tagging in accord with aspects of the claimed subject matter.

Figure 10:
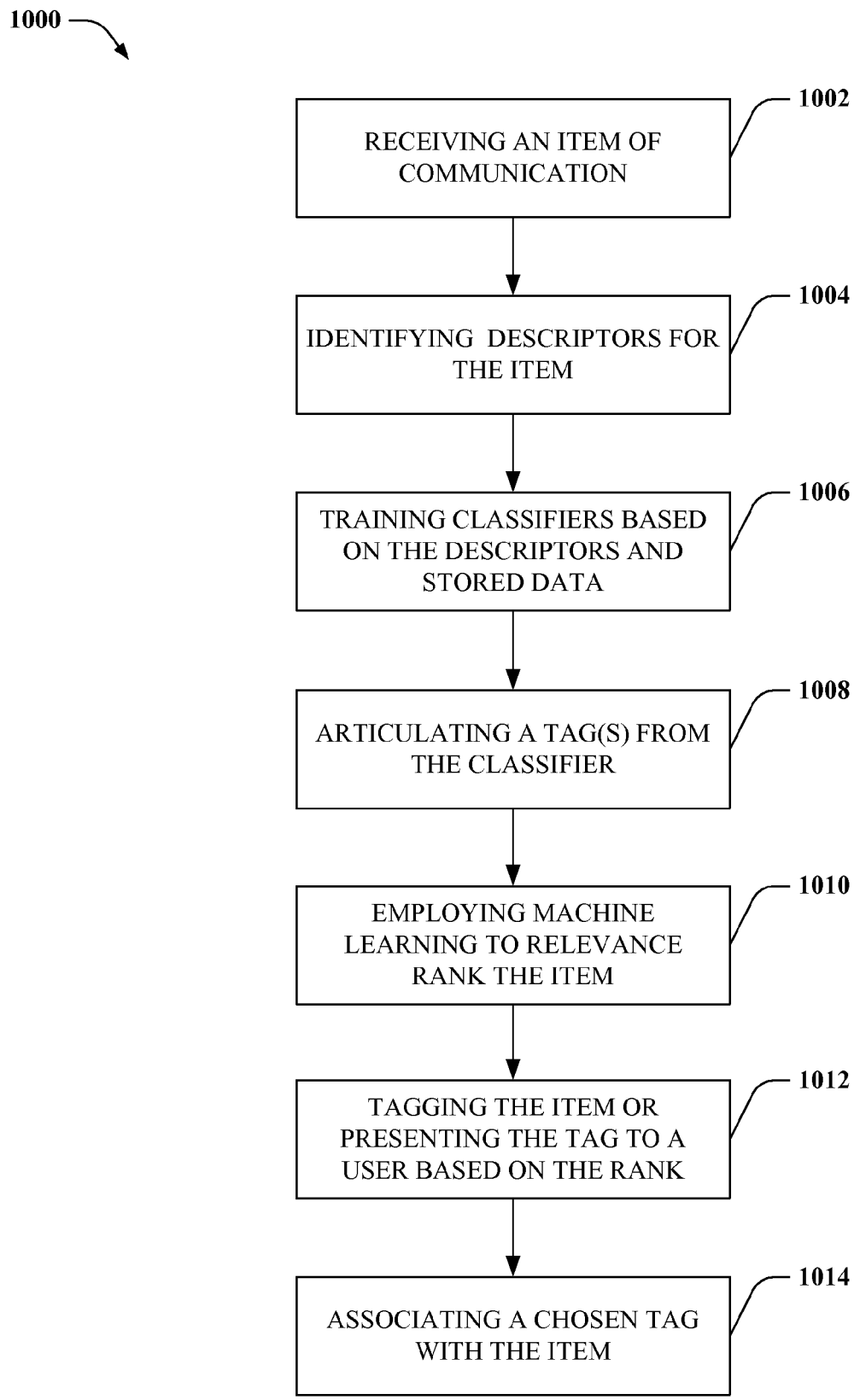
FIG. 10 illustrates a sample methodology employing heuristics and machine learning to generate and associate tags with items of communication.

FIG. 10 illustrates a sample methodology 1000 employing models, classifiers and/or machine learning to generate and associate tags with items of communication. At 1002, an item of communication is received. At 1004, descriptors for the item can be identified. At 1006, classifiers can be trained based on the descriptors and stored data. Such stored data can include prior user defined/approved tags and relation to associated items of communication, user specified preferences, sender/recipient MRU tag lists, or the like. At 1008, one or more tags can be articulated from the classifier. For instance, if the classifier identifies several keywords descriptive and/or representative of the content of the received item, or pertinent to user defined tags, or MRU tags, such keywords/phrases can be formed into tags as described herein. At 1010, machine learning can be employed to relevance rank the tag(s). Ranking can be a result of a degree of association with the content of a received item, for instance, or correspondence to user preferences, or the like. At 1012, the tag can be presented to a device user, either as a proposed tag or assigned and/or attached to the received item of communication. Optionally, at 1014, a chosen tag (e.g., indicated by user input on a device) can be associated with the received item of communication. As described, methodology 1000 can facilitate accurate and efficient tagging based on user preferences, tag history and machine learning techniques.

Figure 11:
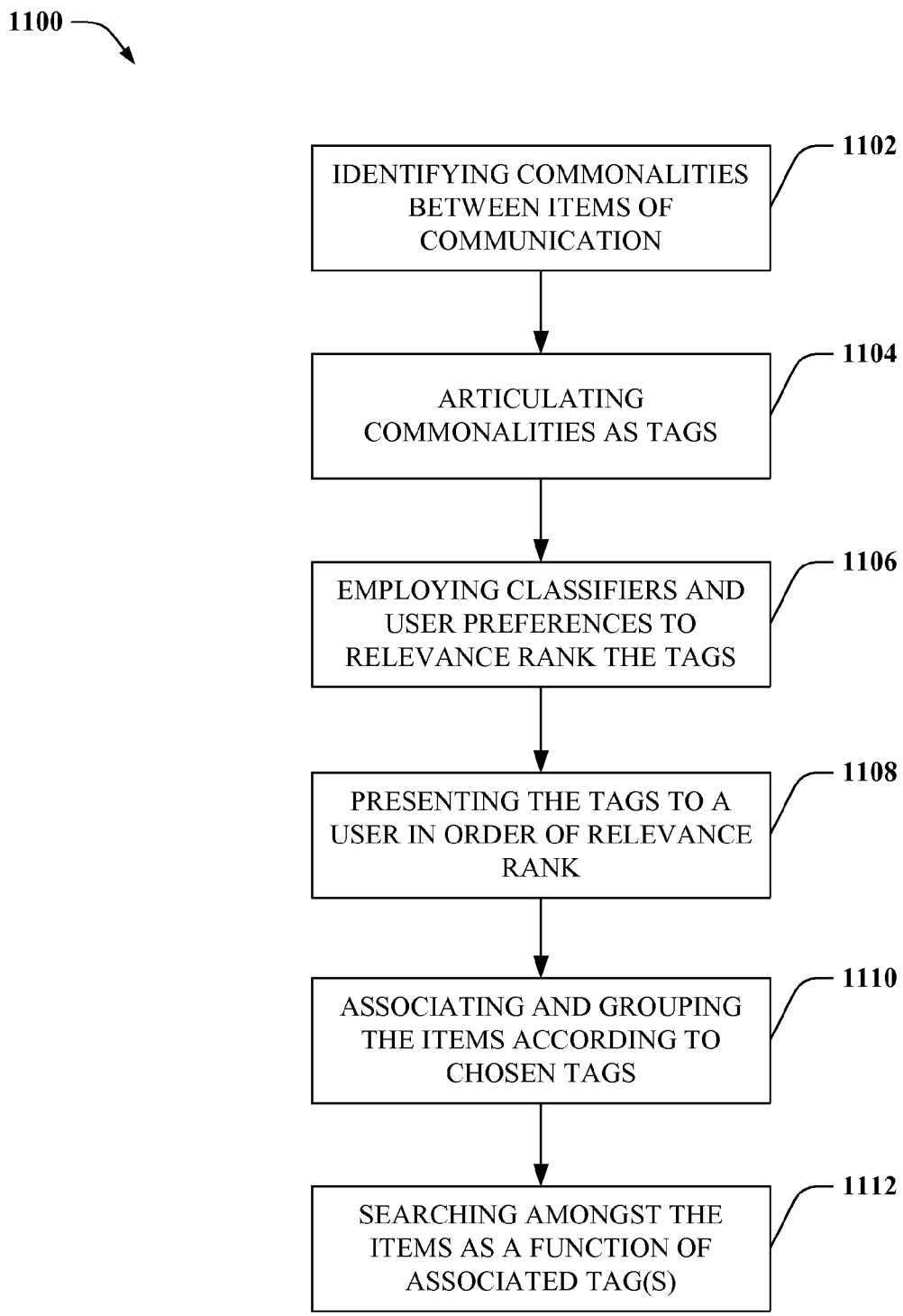
FIG. 11 depicts an example system for employing machine learning to group multiple items of communication by tags and search amongst such items by reference to the tags.

FIG. 11 depicts an example system for employing machine learning to group multiple items of communication by tags and search amongst such items by reference to the tags. At 1102, commonalities between items of communication can be identified (e.g., as discussed above at FIG. 800). At 1104, identified commonalities can be articulated as tags. At 1106, classifiers and user preferences can be employed to relevance rank the tags. At 1108, the tags can be presented to a device user in order of relevance rank. At 1110, the items can be associated and grouped according to common/related tags chosen by a device user and associated with such items. At 1112, stored items can be searched as a function of the associated tags. As described, methodology 1100 can enable organization, search and retrieval of stored items of communication based on descriptive tags generated and assigned to such items.

Figure 12:
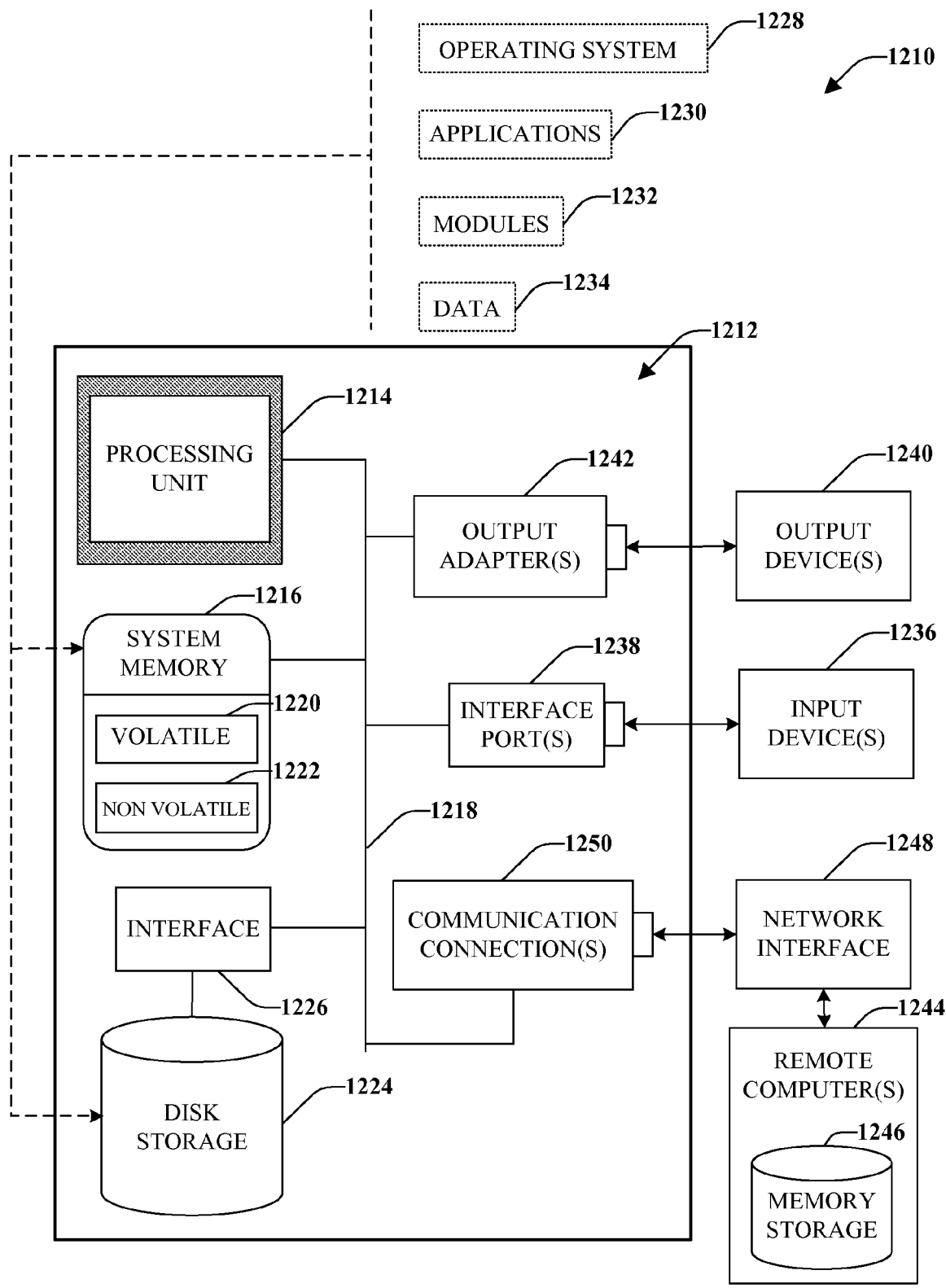
FIG. 12 illustrates a sample computing environment that can implement automated processes in accordance with aspects of the subject innovation.
Figure 13:
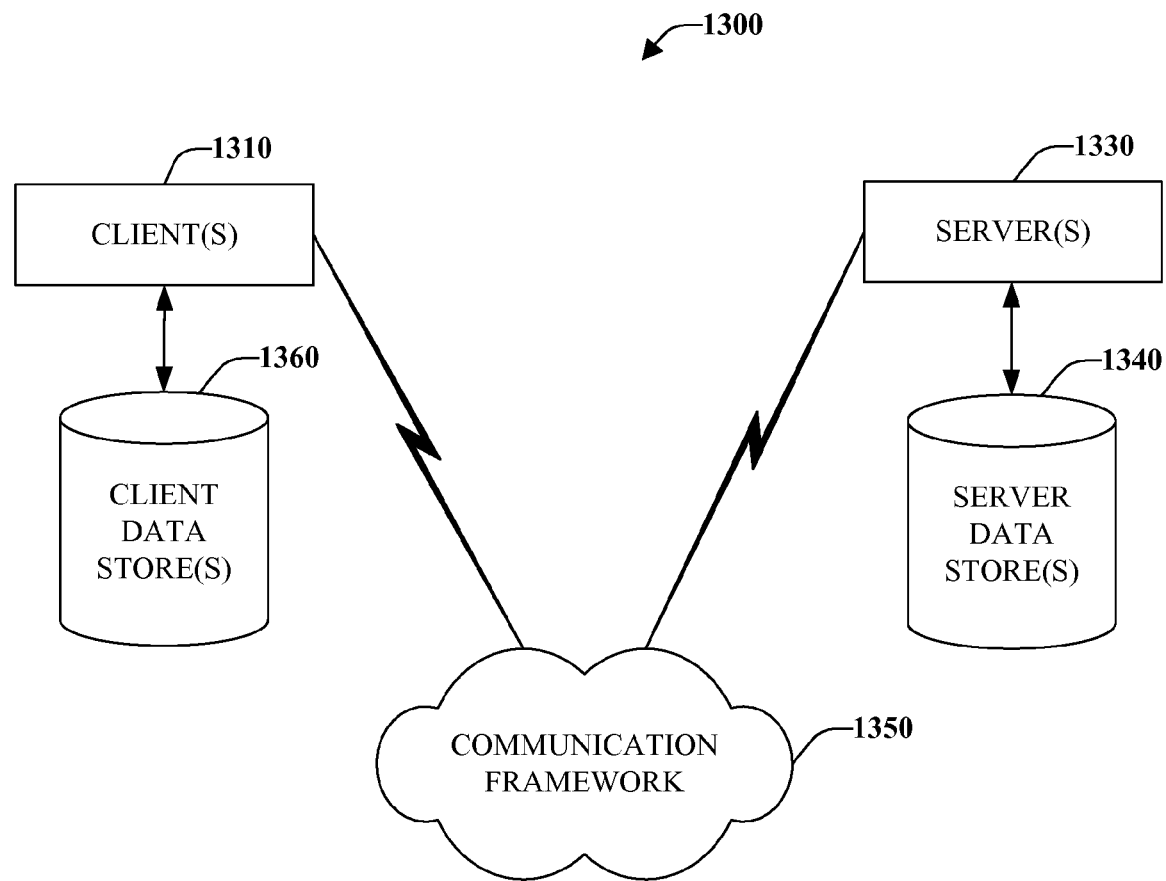
FIG. 13 depicts an example networking environment for sending, receiving and distributing communication and tags associated therewith in accordance with particular aspects disclosed herein.

In order to provide additional context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 can couple system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 13 10. Similarly, the server(s) 1330 are operatively connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that provides tags for e-mail and syndicated content communication, the system comprising:
    at least one memory;
    at least one processor;
    components having executable instructions stored in the at least one memory and executed by the at least one processor, the components comprising:
        a receiver component that accepts a transmission of an instance of e-mail or syndicated content communication;
        a filtering component that analyzes at least one most recently used (MRU) sender information tag utilized with prior items of communication provided by a sender of the instance of communication, at least one MRU recipient information tag utilized with prior received items of communication by multiple recipients of the instance of communication and one or more weighted portions of the instance of communication and generates one or more information tags for the instance of communication based in part on the analyzing, wherein:
            the one or more weighted portions of the instance of communication comprise at least one of a subject line or a portion of content of the instance of communication;
            the one or more information tags are descriptive of and classify the instance of communication; and
            the one or more information tags are determined based at least in part on determining an associated relevance factor for the one or more information tags, the associated relevance factor indicating a degree to which a corresponding one of the one or more information tags are descriptive and representative of the instance of communication, the associated relevance factor being determined at least in part by:
                computing a frequency of occurrence of the corresponding one of the one or more information tags within the instance of communication; and
                computing an association between the at least one MRU sender information tag, the at least one MRU recipient information tag and the one or more weighted portions of the instance of communication; and
        a tagging component that attaches or includes the one or more information tags with the instance of communication.

2. The system of claim 1, further comprising:
    a machine learning component that associates the associated relevance factor with the corresponding one of the one or more information tags, the associated relevance factor being further determined in part by an association between the corresponding one of the one or more information tags and at least one of one or more preferred recipient information tags previously indicated as preferred by at least one of the multiple recipients, one or more preferred sender information tags previously indicated as preferred by the sender or one or more sender tags included in the transmission of the instance of communication.

3. The system of claim 2, further comprising:
    a storage component that stores tags that include the at least one MRU sender information tag, the at least one MRU recipient information tag, the one or more preferred recipient information tags and the one or more preferred sender information tags, one or more of the stored tags being utilized by the filtering component or the machine learning component to establish a relevance rank for the one or more information tags.

4. The system of claim 3, wherein the storage component further stores data related to the sender, the multiple recipients, recipient user preferences, sender user preferences, text within a title of the instance of communication, text within a subject line of the instance of communication, text within the content of the instance of communication, text within a heading of the instance of communication, data related to pre-existing tags, metadata, or extended information associated with the instance of communication, or combinations thereof, at least part of the data being further utilized by the filtering component or the machine learning component to establish the relevance rank for the one or more information tags.

5. The system of claim 1, further comprising:
a presentation component that furnishes the one or more information tags to a device accessible to a device user in an order based on the associated relevance factor of the one or more information tags.

6. The system of claim 1, further comprising:
a user input component that facilitates user approval of the one or more information tags in conjunction with the instance of communication and facilitates user specification of one or more weighting factors, at least one of the weighting factors being specified for the one or more weighted portions of the instance of communication, the associated relevance factor being further determined in part by adjusting the frequency of occurrence by at least a corresponding one of the weighting factors.

7. The system of claim 1, wherein the instance of syndicated content communication includes web-transmitted data utilizing rich site summary (RSS 0.91) formatting, resource description framework site summary (RSS 0.90 and 1.0) formatting, or really simple syndication (RSS 2.0) formatting, or combinations thereof.

8. The system of claim 1, wherein the instance of syndicated content communication includes a web feed instance, a web blog feed instance, an instant message, a saved instant message, or a short message service message, or combinations thereof.

9. The system of claim 1, further comprising a list management component that:
stores a list of MRU tags associated with one or more senders or one or more recipients of the instance of communication; and
distinguishes between MRU sender information tags utilized by the one or more recipients as a function of the sender of the instance of communication.

10. One or more computer-readable storage devices having computer-executable instructions stored thereon that, when executed, direct a computer to perform a method for automatically generating information tags for electronic communication, the method comprising:
determining most recently used (MRU) recipient tags utilized by multiple recipients of instances of electronic communication;
distinguishing between MRU recipient tags utilized by the multiple recipients of the instances of electronic communication as a function of:
the instances of electronic communication; and
at least one corresponding sender of the instances of electronic communication;
identifying commonalities among weighted portions of the instances of electronic communication and MRU recipient tags associated with the instances of electronic communication; and
transforming one or more of the commonalities into an information tag based at least in part on a relevance factor associated with a relevance of the information tag to the instances of electronic communication, the relevance factor being determined based at least in part on:
a degree to which the information tag is descriptive of the weighted portions of the instances of electronic communication;
an adjusted frequency of occurrence of the information tag within the instances of electronic communication, the frequency of occurrence being adjusted based on a weighting factor associated with the weighted portions of the instances of electronic communication; and
a relationship between the information tag and one or more of the MRU recipient tags.

11. The one or more computer-readable storage devices of claim 10, wherein the information tag is determined to be most representative of the instances of electronic communication based on the relevance factor being higher than a predetermined threshold, the relevance factor indicating a relationship of the information tag to the one or more of the MRU recipient tags and one or more of the weighted portions of the instances of electronic communication.

12. The one or more computer-readable devices of claim 11, wherein the method further comprises recommending the information tag to associate with the instances of electronic communication based on the relevance factor being higher than the predetermined threshold .

13. The one or more computer-readable storage devices of claim 10, the relevance factor being determined based further on employing trained classifiers, data models or machine learning calculations, or combinations thereof, to determine the relevance of the information tag to the instances of electronic communication with respect to the one or more of the MRU recipient tags and one or more of the weighted portions of the instances of electronic communication.

14. The one or more computer-readable storage devices of claim 10, wherein the method further comprises:
transforming other of the commonalities into one or more other information tags;
determining a relevance factor for the one or more other information tags;
combining the information tag and the one or more other information tags into a plurality of information tags having an associated relevance factor; and
ranking the plurality of information tags as a function of associated relevance.

15. The one or more computer-readable storage devices of claim 14, wherein the method further comprises presenting the plurality of information tags in order of decreasing relevance.

16. The one or more computer-readable storage devices of claim 10, wherein the information tag is descriptive of at least one of the identified commonalities associated with the instances of electronic communication.

17. A system for automatically tagging e-mail communication and syndicated electronic content, the system comprising:
at least one memory;
at least one processor;
components having executable instructions stored in the at least one memory and executed by the at least one processor to perform acts, the acts comprising:
generating one or more metadata tags relevant to one or more weighted portions of an item of syndicated electronic content or e-mail communication, the one or more weighted portions being weighted by an associated weighting factor, the one or more metadata tags being descriptive of and configured to classify content of the item;
distinguishing most recently used (MRU) recipient metadata tags associated with prior received items of communication from a sender of the item that are most recently used by multiple recipients of the item;

training classifiers for the one or more metadata tags based in part on data relevant to the item and the MRU recipient metadata tags, the classifiers providing a relevance factor in relation to the item for an associated metadata tag, an associated relevance factor indicating a degree to which an associated one of the one or more metadata tags are descriptive of the item, the associated relevance factor being calculated based in part on:
- a frequency of occurrence of an associated one of the one or more metadata tags within the item, a frequency of occurrence being adjusted based on one or more of the associated weighting factors; and
- a relationship between the associated one of the one or more metadata tags and one or more of the MRU recipient metadata tags;

sorting the metadata tags based on the relevance factor associated with each metadata tag; and attaching the one or more metadata tags with the item.

18. The system of claim 17, wherein the acts further comprise:
presenting the one or more metadata tags to a device user as a function of an associated relevance factor.

19. The system of claim 17, wherein the acts further comprise:
searching and identifying a plurality of saved items of communication based on one or more metadata tags associated with the item; and sorting the plurality of saved items, identified by the searching and identifying, based on relevancy of the one or more metadata tags to search criteria.

* * * * *